United States Patent [19]

Thompson et al.

[11] 4,032,294

[45] June 28, 1977

[54] METHOD FOR VAPOR PHASE TREATING GARMENTS

[75] Inventors: Richard D. Thompson, Cincinnati, Ohio; Douglas Thompson, Salt Lake City; Micheal G. Beeley, Logan, both of Utah

[73] Assignee: McGraw-Edison Company, Elgin, Ill.

[22] Filed: Feb. 1, 1974

[21] Appl. No.: 438,587

[52] U.S. Cl. .................................. 8/116.4; 8/127.6
[51] Int. Cl.² ........................................ D06M 13/14
[58] Field of Search .......................... 8/116.4, 127.6

[56] References Cited

UNITED STATES PATENTS

| 3,865,545 | 2/1975 | Forg et al. | 8/116.4 |
| 3,884,632 | 5/1975 | Payet et al. | 8/116.4 |

*Primary Examiner*—Carman J. Seccuro
*Attorney, Agent, or Firm*—Charles F. Lind

[57] ABSTRACT

Apparatus for and method of vapor phase treating garments of natural protein or cellulosic fibers such as of cotton, wool, or synthetic blends thereof each hung in substantially wrinkle-free condition on a form, with moisture, formaldehyde and an acidic catalyst like sulfur dioxide, comprising a series of separate cabinets each having an access opening and a conveyor system through the cabinets, and means for indexing successive generally equal sized batches of such forms with garments thereon sequentially through the cabinets for simultaneous exposure of the batches in the respective cabinets to different stages of the treatment and sequentially to exposure of each batch to all stages of the treatment.

10 Claims, 10 Drawing Figures

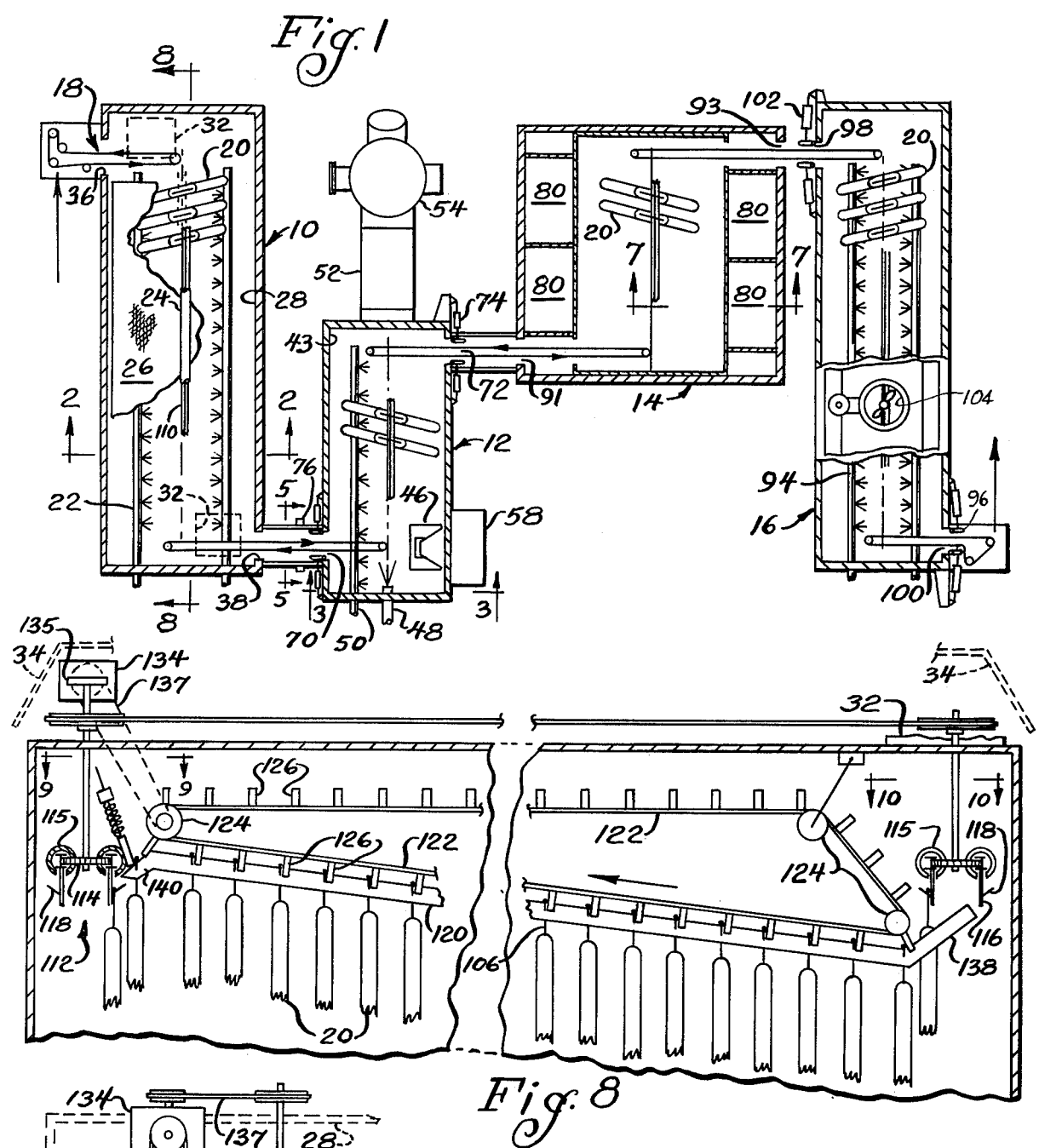
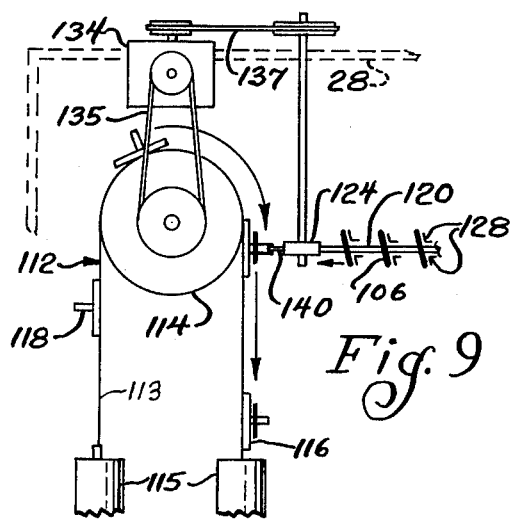
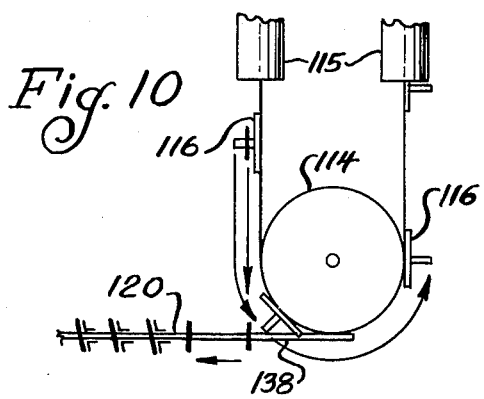

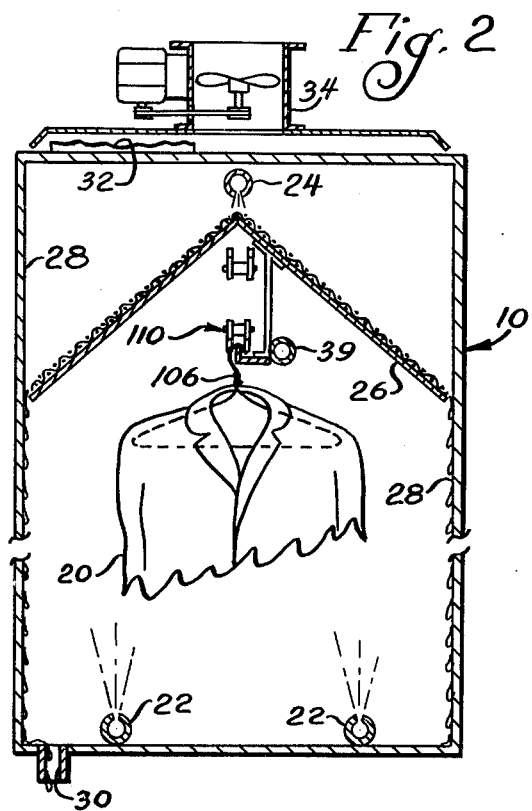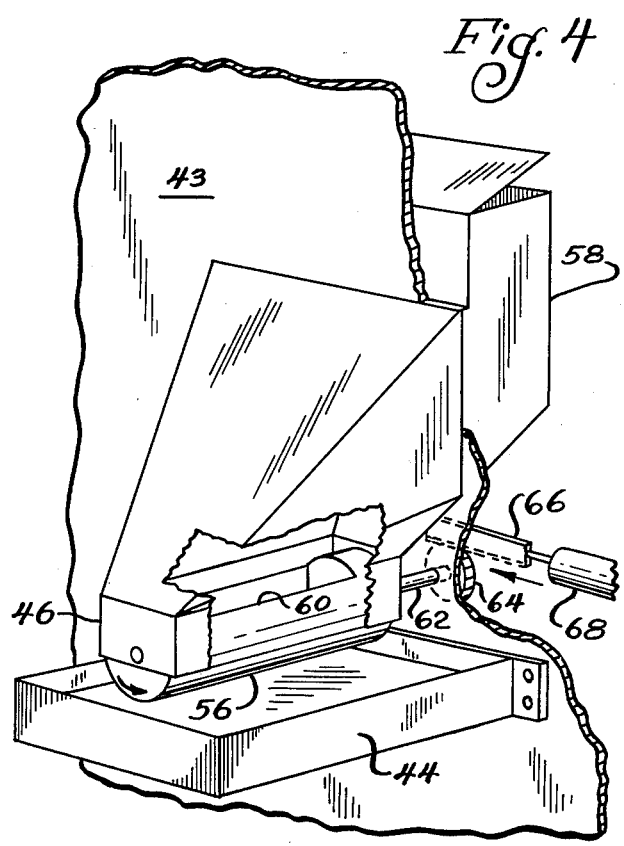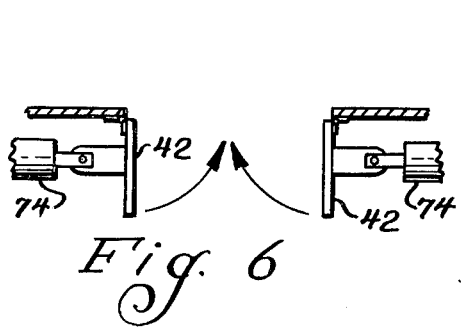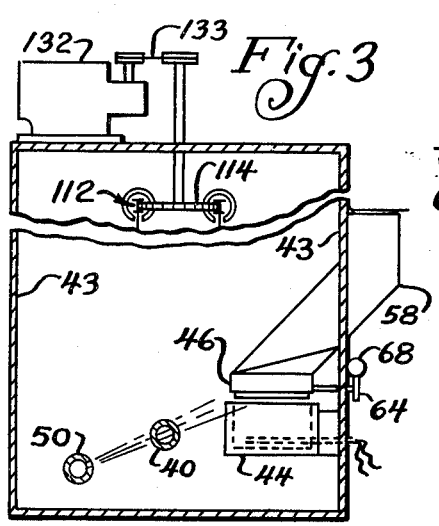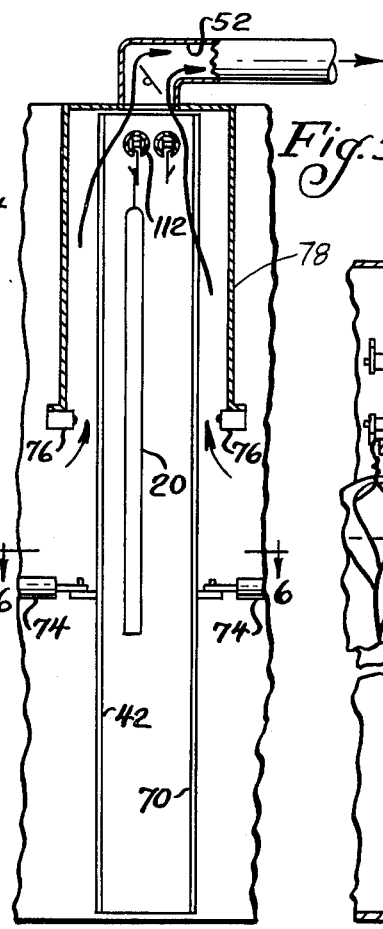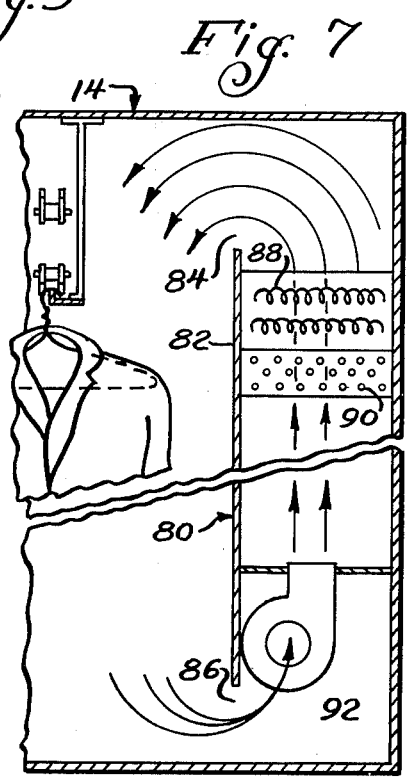

METHOD FOR VAPOR PHASE TREATING GARMENTS

This invention represents an improvement over that disclosures of the Swindler et al U.S. Pat. No. 3,706,526 issued Dec. 19, 1972 entitled "Process for Treating Cellulosic Material with Formaldehyde and Sulfur Dioxide", and the Payet et al U.S. Pat. No. 3,660,013 issued May 2, 1972 entitled "Method and Apparatus for Producing A Durable Press In Garments Containing Cellulose or Cellulosic Derivatives".

A basic object of this invention is to provide commerical apparatus for and method of treating cellulosic fiber garments with moisture, formaldehyde and a catalyst like sulfur dioxide to render same to a durable press or equivalent condition, where the apparatus is sufficiently economical to build and operate and where the method can reliably treat sufficient quantities of such garments at commercially accepted standards of quality and costs.

Another object of this invention is to provide apparatus of the type noted above which operates on successive batches of garments sequentially, each batch of garments being subjected successively in separate cabinets to a single operating phase of the overall required process.

These and other objects will be more apparent and appreciated after reveiwing the following specifications, the accompanying drawings forming a part thereof, wherein:

FIG. 1 is a top plan view, in semi schematic form, of the apparatus preferred in the subject invention;

FIG. 2 is a sectional view of the moistening cabinet, as seen generally from line 2 — 2 in FIG. 1;

FIG. 3 is a slightly enlarged elevation view, as seen generally from line 3 — 3 in FIG. 1, of the chemical additive cabinet of the subject invention;

FIG. 4 is a perspective view of the chemical additive device disclosed in FIG. 3;

FIG. 5 is an enlarged sectional view, as seen generally from either line 5— 5 in FIG. 1, of the inlet and outlet access openings of the chemical additive cabinet;

FIG. 6 is a plan sectional view, as seen generally from line 6—6, in FIG. 5 showing typical closure door means used on the chemical additive cabinet;

FIG. 7 is an elevated sectional view, as seen from either line 7 — 7 in FIG. 1, of the heater cabinet;

FIG. 8 is a enlarged partial sectional view, as seen generally from line 8—8 in FIG. 1, showing a typical cabinet conveyor and the transfer points between the transit conveyors; and FIGS. 9 and 10 are plan views as seen, respectively generally from lines 9—9 and 10—10 in FIG. 8, showing further details of the transfer means between the transit and cabinet conveyors.

The disclosed system has four separate and separated cabinets 10, 12, 14 and 16, and a conveyor system 18 indexes garments 20 suspended in a natural substantially wrinkle-free condition successively in batches through these cabinets. In each cabinet an individual and distinct stage or phase of the treating process is performed, and the process is thus semi-continuous in that each cabinet only completes one phase of the whole process although it for the most part operates this phase continuously even while the garments are indexed between the cabinets toward completion of the whole process.

The initial cabinet 10 (FIGS. 1 and 2) provides for moistening each batch of garments to where the water weight is approximately 5-20% of the cellulose weight in the garment while keeping the temperature less than 100 to 140° F. To do this, moist low pressure steam is discharged from outlets 22 throughout the cabinet, the cabinet is cooled by running water from outlet 24 down an inclined top wall 26 and the inside vertical walls 28 to drain 30, and ceiling openings 32 to a vented hood 34 allow for migration of ambient cool air into the cabinet through the normally opened inlet and outlet access openings 36 and 38, respectively. Condensation as vapor thus forms on the garments to moisten them uniformly and without localized wetting. Since the conditioning must be uniform, the steaming cabinet side walls 28 are separated sufficiently to avoid any wetting contact with the suspended garments. By having the water cooled top walls 26 inclined, and by having the conveyor heated by steam line 39 thereon, the possibility of condensate forming on and then dripping from either onto the garments is minimized. The convective rise of the warm atmosphere through the ceiling vents assisted by power vent 34 draws cooling outside air through the cabinet access openings and thereby allows continuous steaming without closure doors since the air inflow prevents outward steam migration.

After the garments are moistened, they are indexed into the second cabinet 12 which is then closed off by doors 42 from the outside air. The garments are subjected to a chemically controlled atmosphere of formaldehyde, a catalyst such as sulfur dioxide, and steam, at a temperature of approximately 100° – 120° F. for a duration of approximately 40 – 100 seconds. The concentration of chemicals found most acceptable is approximately 6 – 10% by volume formaldehyde, ½ to 2% by volume sulfur dioxide, and the rest high humidity 70–100% air.

To add the formaldehyde to the cabinet, a platen 44 electrically heated to a temperature of about 400°–600° F. is provided, and paraformaldehyde powder in metered quantities is dropped from a dispensing device 46 onto this platen and vaporized. Sulfur dioxide gas is directed into the cabinet in metered quantities from an outlet 48 laterally offset from the platen 44. Steam is discharged from outlets spaced along a pipe 50 near the floor of the cabinet and in a direction generally toward the sulfur dioxide outlet 48 and to above the platen. This effectively mixes the sulfur dioxide, and formaldehyde and circulates this high humidity atmosphere within the cabinet and uniformly over the suspended garments.

The steaming can begin before the doors 42 are closed, preferably during the indexing into the cabinet of maybe the last 2 – 4 garments, and moreover continues until just prior to the conclusion of the chemical additive phase of the cycle and the doors are once again opened. The sulfur dioxide and paraformaldehyde are discharged into the cabinet typically in only a matter of seconds and this atmosphere is allowed to encompass the garments. At the conclusion of the cycle the cabinet atmosphere is vented through piping 52 from the cabinet to gas scrubbed unit 54 for discharge to the atmosphere, and thereafter the doors are opened.

The paraformaldehyde dispensing device 46 (FIG. 4) includes cylinder 56 supported to rotate 180 degrees in sealed vertical registry with the discharge opening of a hopper 58. The cylinder has a cutout 60 in one face that fills with powder, and a shaft 62 from the cylinder supports gear 64 that is rotated by rack 66 actuated by a two-way cylinder 68 for powered rotation of the cylinder. The paraformaldehyde powder is slipery so that it fills the metered cutout and then drops out of the cutout 60 onto the platen 44 when the cylinder is rotated 180 degrees to open the cutout vertically down.

As noted above, the access openings 70 and 72 are closed by doors 42 which are operated by two-way power cylinders 74. These doors are opened on a timed signal after the chemical additive phase of the cycle to allow the garment indexing. A photo cell 76 scanning the path of garment movement immediately prior to the inlet access opening 70 to the gas additive cabinet senses the presence of a garment on the conveyor system 18, and this can be used for beginning the timed control of the chemical additive phase of the cycle including closing the cabinet doors after all garments have been indexed into the cabinet. After the chemical treatment, the gases in the cabinet are exhausted through gas scrubber unit 54 for cleaning same and thereafter are discharged to atmosphere. In some cases, it might he desired to vent the cabinet some 5 – 15 seconds before opening the doors, and even a short time thereafter during the subsequent indexing of garments. Ambient makeup air is drawn through the access openings to hold gas migration to outside the cabinet to a minimum. A sniffer hood 78 located adjacent over each access opening and above the conveyor system 18 minimizes leakage from the opening and/or from the indexing treated garments, and the hood is connected for discharge through the scrubber 54.

The chemically treated garments are indexed into a third cabinet 14 which has four heating and air circulating devices 80 located two each on opposite sides of the grouped garments. Each device 80 is identical including wall structure 82 defining an air path outlet 84 to and return 86 from the cabinet chamber with both electric resistance heaters 88 and a steam heat exchanger 90 located in series flow downstream of a blower 92 that circulates air slowly through the chamber. The air flow is moderate to avoid flapping of the garments and the air is at 0 — 30% relative humidity heated to between 220° and 350° F. This heats the garments to in excess of 220° to 280° F. without scorching them and also drys them to a water weight of less than 1% of the cellulosic fiber in the garment. The cabinet 14 can be maintained hot at all times with the blowers operated continuously, and the inlet and outlet access openings 91 and 93 can be opened at all times or at most closed when the garments are not indexing with low cost flapper doors (not shown) to minimize the heat loss.

The garments are next indexed to the cleaning cabinet 16 where high temperature steam is used to moisten them and to vapor distill any residual non-linked formaldehyde on them. This cabinet has steam tubes 94 running the length of the cabinet with spaced discharge outlets for uniformly discharging the steam, which gives an atmosphere of high humidity air between 40 – 90% and at approximately 150° – 300° F. and preferably over 200° F. To minimize heat loss from the cabinet, doors 96 are used to close the inlet and outlet access openings 98 and 100 respectively, and each is operated by a power cylinder 102. Steaming can occur on a cycle similar to the steaming of the chemical additive cabinet 12, vis to begin before the last 2-4 garments are indexed into the cabinet and to continue after the doors are closed at the beginning of the timed cycle on to just prior to the end of the cycle when the doors are opened. When the garments are exposed to this high temperature steam atmosphere the residual non-linked formaldehyde which has an offensive odor is driven from the garments and can be vented through conduit 104 to the scrubber 54 or out the doors only to atmosphere as conditions demand. Typically the garments are heated sufficiently in this cabinet to air dry while hanging on a slick rail or other take-away conveyor device after being discharged from the cabinet.

In the proposed apparatus and process, it is contemplated that each cabinet is used exclusively for its particular phase of the process, and that the garments are indexed successively through the various cabinets. This has distinct advantages over combining all the process phases in a single unit. Firstly, the cost of the equipment can be reduced since each cabinet need only be of sufficiently durable material to withstand the rigors of its own operating phase and is not contaminated by the effects of any non-related phase. Thus the steaming 10, heating 14, and cleaning 16 cabinets are exposed typically only to steam, heat and/or air so that corrosion is not severe and these structures can consequently each be fabricated of a relatively low-cost material such as aluminum; while the chemical additive cabinet 12 with its corrosive atmosphere can be fabricated of high-grade stainless steel. Secondly, the cost of operating the equipment continuously is reduced because the temperature of each cabinet can be uniformly maintained within its required operating range, although the temperatures differ from cabinet to cabinet, to eliminate power and time consuming heat up or cool down periods.

As noted above, the garments are indexed in groups successively by a conveyor system 18 through the moistening, chemical additive, heating, and cleaning cabinets, and what is required in order to make the process work satisfactorily is to subject the garments to the atmosphere in each in a manner and for a time to be uniformly conditioned or treated. With the cabinet system disclosed herein, it is possible to size one of the cabinets, for example the chemical additive cabinet, to hold a batch or specified number of garments and to time the cycle to the 40 – 100 seconds required for this additive phase of the cycle. The other cabinets are sized to hold the same batch of garments, or larger to hold two, three or even more consecutive batches of garments. For example, experience indicates that the conditioning and the cleaning phases of the process take longer than the 40 – 100 seconds, and this can be accomodated by making such cabinets twice as large as the additive cabinet to hold simultaneously two consecutive batches of the indexing garments and thus subject each batch in effect to two repetitive operating cycles. The drying cabinet can be sized the same as the additive cabinet. Moreover since each cabinet other than the chemical additive cabinet can and does have more or less a continuously present uniform atmosphere approaching that when fully operating, some beneficial exposure of the garments to the operating atmosphere is had even during garment indexing.

Considering, for example, a 60 second treating time for the chemical additive phase of the cycle and an indexing time of 30 seconds, the total lapse time between successive phases of the cycle is 90 seconds. The steaming, heating and cleaning in the respective cabinets each is effective to varying degrees for this entire duration or a direct integral digit of this time depending on the cabinet size. Thus, the steaming and cleaning cycles are each almost 180 seconds, and the heating cycle is almost 90 seconds. A "batch" of garments might total 15 to 25 garments, for example.

The disclosed apparatus has, as noted a continuous conveyor system 18 for carrying the garments successively through the cabinets during the cycle. Hangers or forms 106 hold the garments 20 in the shape each might more normally assume in wear or at least in a substantially wrinkle-free configuration. In practice, the conveyor system 18 is made up of many small segments of transit and cabinet conveyors. Each cabinet conveyor 110 (FIG. 8, for example) is designed to support the adjacent garments in closely packed front-to-rear spaced relationship to give a large garment holding capacity in any cabinet as compared to the overall size of the cabinet. Each transit conveyor 112 is designed to hold the adjacent garments on an edge-to-edge or in line orientation (FIG. 9 for example) for movement to and from the respective cabinets, and this allows the cabinet access openings to be narrow to reduce leakage from and/or the sealing problems of the openings. A transfer is then made from the infeed transit conveyor 112 to each cabinet conveyor 110, (See FIG. 10), and again from each cabinet conveyor 110 to the outfeed transit conveyor 112 (See FIG. 9). The garments can be easily fed onto the conditioning cabinet infeed transit conveyor by automatic conveyor loading equipment, and likewise the garments from the cleaning cabinet can be automatically loaded onto a takeaway conveyor.

Each transit conveyor 112 typically has a roller link chain 113 trained over sprockets 114 supported on shafts to rotate about vertical axes where slotted pipe 115 supports any long runs of the chain. A series of equally spaced brackets 116 on the chain projecting downwardly through the pipe slot, and each bracket has an upwardly inclined tab 118. The hook of each hanger 106 can thus be easily positioned over the tab to be held in place on the bracket. The center spacings between all brackets on any one transit conveyor are equal, and for garments of conventional size might be set as approximately between 20 and 25 inches.

Each cabinet conveyor 110 can comprise a stationary slide rail 120 to support the hook of each hanger, and a roller chain 122 above the rail carried on sprockets 124 rotating about horizontal axes has a series of equally spaced pushers 126 with spaced fingers 128 that straddle the slide rail to engage the hanger hooked thereon. Preferably the cabinet conveyor orients the garments in face to face relationship at parallel angles slightly out of true normal to the slide rail to allow for the direct infeed and/or outfeed transfer of the successive garments without interference between one another. To accomodate this, each near side pusher finger (relative to the infeed transit conveyor) is slightly forward of the far side pusher finger to cant the hanger and thus the garment thereon. The typical equal centers spacing of the pushers 126 might be set as approximately between 2 and 4 inches.

The transit conveyor 112 and adjacent cabinet conveyor 110 are operated at different speeds, inversely proportional to the ratio of the center spacings of the brackets 116 and pushers 126 to provide a continuous through flow of garments. To accomplish this, the adjacent conveyors can be driven off one another, with only a single power input being provided for example at gear motor 132 mounted on additive cabinet 12 and having sprocket and chain drive connection 133 with the transit conveyor shaft. A bevel gear box 134 with right angle output shafts can be used with drives 135 and 137 to interconnect respectively the shafts of the transit conveyor (operating on vertical axes) and the shafts of the cabinet conveyor (operating on horizontal axes). In a preferred embodiment, it has been found more economical to use a separate continuous loop chain drive 136 located on the roof of each cabinet as the power train between the shafts of adjacent transit conveyors, thereby permitting reduced sizing of the cabinet conveyor chain 122.

The hangers are transferred individually from each transit conveyor 112 to each cabinet conveyor 110, and vice versa, as follows. The transit conveyor discharge end sprocket 114 is small in diameter and is located so that its pitch line edge is aligned with the slide rail 120. Because of the high speed of the conveyor compared to the small sprocket, the hanger is thrown off the bracket tab 118 as the bracket rounds the sprocket to drop onto a steeply inclined portion 138 of the slide rail, to be carried away then only by gravity until under the control of the pusher fingers 128. The infeed portion 138 of the rail is thus lower than the tab in this transfer region, and the rail 120 is inclined upwardly along the length of the cabinet until the downwardly inclined outfeed portion 140 that is higher than the tabs of the next transit conveyor and terminates slightly above these tabs. This thereby allows the hanger to slide by gravity out of control of the pusher fingers to a retractable plunger stop 142 that in one position blocks the hanger on the outfeed portion of the rail. A limit switch (not shown) adjusted to be actuated by an approaching transit conveyor bracket triggers a control that might include a solenoid to lift the plunger to a second position clear of the rail to release the hanger and allow the same to drop by gravity in proper synchronization onto the passing bracket pin.

The particular vapor phase process has been found most acceptable on cellulosic fibers such as cotton and cotton synthetic blends and/or natural protein fibers such as wool and wool blends. The weight of the garment, the weave, and percentage of cellulosic or natural protein fiber in the garment determine in part the most effective parameters of chemical compositions, cabinet temperatures and cycle durations, with typically the heavier and closer weave garments requiring the higher chemical ranges and longer cycle times than the lighter weight and more open weave garments. Similarly, wool and its blends typically require the higher concentrations and more extended cycle times then do the cotton and cotton blended garments. The disclosed parameters required for the garments as discharged from each of the cabinets specify what is considered necessary for achieving uniformly accepted commercial quality garment, but variations might be possible for lesser standards of quality. Likewise the disclosed temperatures, cabinet atmosphere, and cycle times give a commercially acceptable system considering space, horsepower, cost requirements, and production outputs. For example, a certain degree of reaction or linking of the formaldehyde occurs in the chemical cabinet while the garments are in the moistened condition, while a greater percentage of set occurs in the drying cabinet particularly while drying to a less than 1% moisture.

We claim:

1. A process for vapor phase treating garments, each having cellulosic or natural protein fibers therein and being supported in a substantially wrinkle-free condition on a form, with moisture, formaldehyde, and sulfur dioxide, comprising:
   a. grouping such garments into first and subsequent batches each consisting of a plurality of garments and each being of substantially the same size;
   b. indexing the defined first batch of garments to a first area of isolation and holding it there to introduce moisture into such garments;
   c. indexing the defined first batch of garments then to a second area of isolation and holding it there to subject such garments to formaldehyde and sulfur dioxide vapors;
   d. indexing the defined first batch of garments next to a third area of isolation and holding it there to heat and dry such garments;
   e. indexing the defined first batch of garments thereafter to a fourth area of isolation and holding it there to vapor clean the garments and remove formaldehyde odor therefrom;
   f. indexing the defined first batch of garments lastly from the fourth area of isolation for concluding the process; and
   g. performing the steps of the above subparagraphs $a$, $b$, $c$, $d$, $e$, and $f$ sequentially on the subsequent batches of garments, whereby the process is carried out simultaneously and progressively in steps on the separate batches of garments alternately being indexed relative to and being held at the respective areas of isolation, so that when a given batch of garments is in a particular one of said areas of isolation, the subsequent batches are in the preceding areas of isolation.

2. A vapor phase process according to claim 1 further including sizing the respective areas of isolation so that each can hold one batch of garments but where at least one is larger than the others by a whole number multiple to hold a like whole number multiple of batches of garments simultaneously, whereby the batches in such larger area of isolation are subjected to a like multiple of holding sequences at such area of isolation and the correspondingly extended exposure therein.

3. A vapor phase process according to claim 1, wherein the first area of isolation has a circulating atmosphere of almost 100% relative humidity air at approximately 100° – 140° F.

4. A vapor phase process according to claim 1, wherein the second area of isolation has a circulating atmosphere of 6 – 10% by volume formaldehyde, ½ – 2% by volume sulfur dioxide, and 70 – 100% relative humidity air at a temperature between 100° – 120° F.

5. A vapor phase process according to claim 1, wherein the third area of isolation has a circulating atmosphere of 0 – 30% relative humidity air between 220° – 250° F.

6. A vapor phase process according to claim 1, wherein the fourth area of isolation has a circulating atmosphere of 40 – 90% relative humidity air between 150° – 300° F.

7. A vapor phase process according to claim 1, wherein the steps of subparagraphs $a$, $b$, $c$, $d$, $e$ and $f$ each comprises a cycle time of approximately 40 – 100 seconds.

8. A vapor phase process according to claim 3, wherein the second area of isolation has a circulating atmosphere of 6 – 10% by volume formaldehyde, ½ – 2% by volume sulfur dioxide, and 70 – 100% relative humidity air at a temperature between 100° – 120° F.

9. A vapor phase process according to claim 8, wherein the third area of isolation has a circulating atmosphere of 0 – 30% relative humidity air between 220° – 350° F, and wherein the fourth area of isolation has a circulating atmosphere of 40 – 90% relative humidity air between 150° – 300° F.

10. A vapor phase process according to claim 9, wherein the steps of subparagraphs $a$, $b$, $c$, $d$, $e$ and $f$ each comprises a cycle time of approximately 40 – 100 seconds.

* * * * *

UNITED STATES PATENT AND TRADEMARK OFFICE
CERTIFICATE OF CORRECTION

PATENT NO. : 4,032,294

DATED : June 28, 1977

INVENTOR(S) : Richard D. Thompson, Douglas Thompson, Micheal G. Beeley

It is certified that error appears in the above-identified patent and that said Letters Patent are hereby corrected as shown below:

Column 8, claim 5, line 17, 250° should be 350°.

Signed and Sealed this

Twentieth Day of December 1977

[SEAL]

Attest:

RUTH C. MASON
*Attesting Officer*

LUTRELLE F. PARKER
*Acting Commissioner of Patents and Trademarks*